No. 814,051. PATENTED MAR. 6, 1906.
J. R. JONES.
HARROW.
APPLICATION FILED APR. 27, 1905.
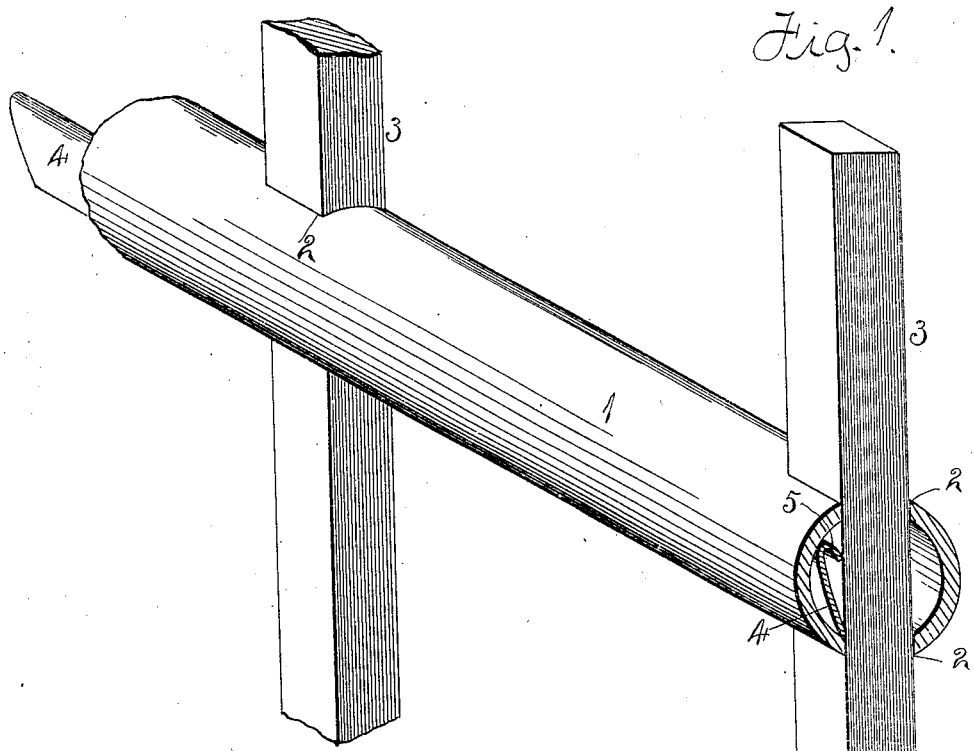
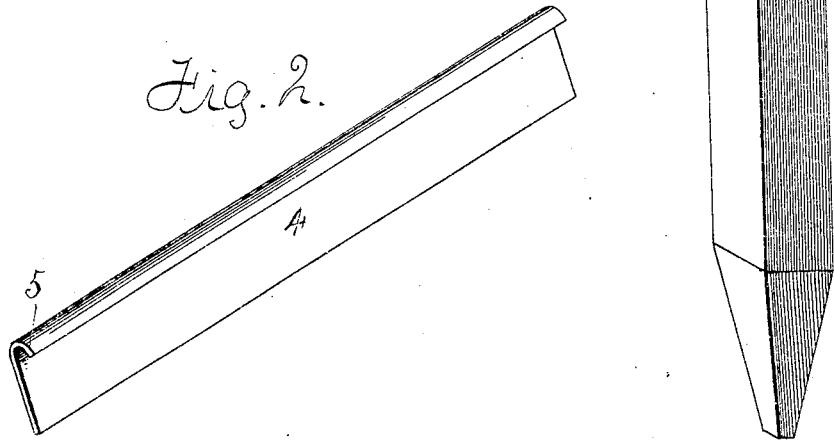
Witnesses:
Inventor:
Judson R. Jones.
By A. O. Behel, Atty.

UNITED STATES PATENT OFFICE.

JUDSON R. JONES, OF ROCKTON, ILLINOIS.

HARROW.

No. 814,051.     Specification of Letters Patent.     Patented March 6, 1906.

Application filed April 27, 1905. Serial No. 257,760.

*To all whom it may concern:*

Be it known that I, JUDSON R. JONES, a citizen of the United States, residing at Rockton, in the county of Winnebago and State of Illinois, have invented certain new and useful Improvements in Harrows, of which the following is a specification.

The object of this invention is to hold the teeth of a harrow in connection with their support without any external fastenings.

This invention consists of a tubular support for the harrow-teeth and a spring-bar located on the inside of the support and impinging against the harrow-teeth in such a manner as to prevent the teeth working upward, but permitting them to be driven down and disengaged from their support for the purposes of sharpening.

In the accompanying drawings, Figure 1 is an isometrical representation of a support and teeth held in connection with the support, the support shown in transverse section. Fig. 2 is an isometrical representation of the fastener.

The support 1 is cylindrical in outline and tubular and is intended to be of a length to hold the required number of teeth. This support in this instance is formed with square openings 2, extending through it transverse to its length. Teeth 3 are square in cross-section and capable of passing through the openings in the support. Within the support is located a bar 4, of spring material, having its upper edge 5 turned over in the form of a hook. After the bar 4 is placed within the support the teeth are driven through the openings 2 the required distance. The upper end of the spring-bar will yield sufficiently to permit their passage. In use the tendency of the teeth is to push upward, as the weight of the supports and the frame to which they are connected is supported by the teeth, and to prevent this action is the purpose of the spring-bar 4. It will be noticed that in order for the teeth to work upward it will be necessary to straighten the hooked end of the spring-bar, which is impossible without exerting greater force than is requried to support the frame. The teeth may be driven out down through the openings as the hooked upper end of the spring-bar yields in that direction. It is evident that the form of the cross-section of the teeth is immaterial.

I claim as my invention—

The combination of a tubular support, teeth passing through the support, and a spring-bar located within the support and having its upper edge in hook form, and impinging against the teeth.

JUDSON R. JONES.

Witnesses:
    PEARLE HERRINGTON,
    LEROY E. TACKLEY.